Dec. 7, 1965     J. JEAN-MARIE ETAL     3,221,412
MEANS FOR MEASURING RAILWAY WHEELS AND AXLES
Filed April 9, 1962     4 Sheets-Sheet 1

Inventors
Joseph Jean-Marie
Pierre Paintendre
By Stevens Davis Miller & Mosher
Attorneys Inventors
Joseph Jean-Marie
Pierre Paintendre
By Stevens Davis Miller & Mosher
Attorneys

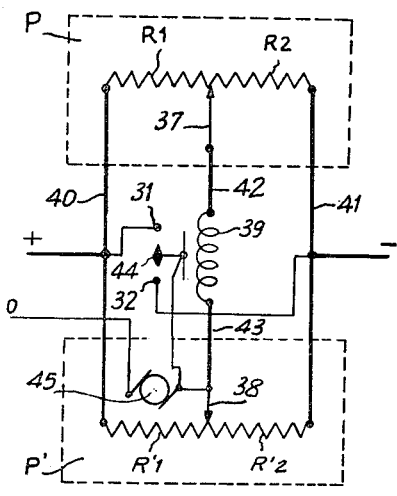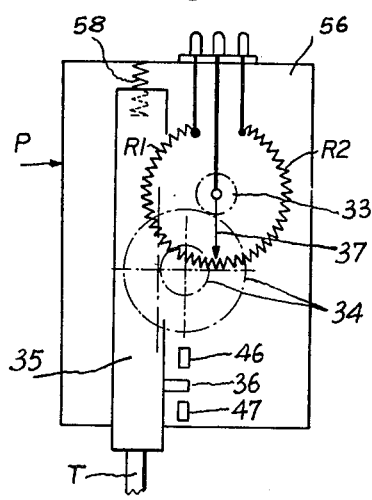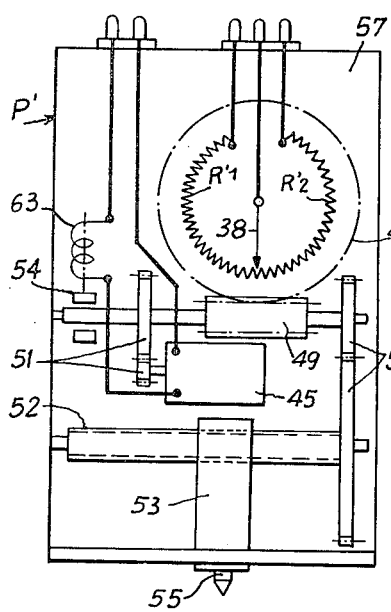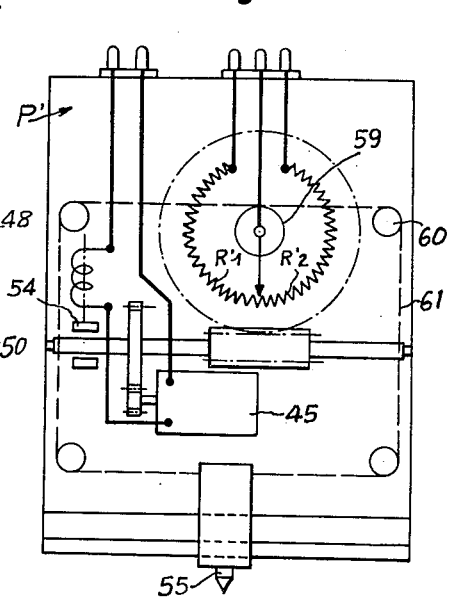

United States Patent Office 3,221,412
Patented Dec. 7, 1965

3,221,412
MEANS FOR MEASURING RAILWAY WHEELS
AND AXLES
Joseph Jean-Marie and Pierre Paintendre, Paris, France, assignors, by direct and mesne assignments, to Societe Anonyme H. Ernault-Somua, Paris, France, a corporation of France
Filed Apr. 9, 1962, Ser. No. 186,237
Claims priority, application France, Apr. 24, 1961, 859,696, Patent 1,295,442
4 Claims. (Cl. 33—174)

Train safety, the trend toward increased railway speeds and better passenger comfort, and the care for reducing rolling-stock wear and tear have led to the manufacture of the wheel and shaft assembly constituting each axle with the maximum precision.

The now general use of tyre reshaping lathes equipped with copying units makes it necessary to determine before the machining step proper the type of copying pattern to be used with due consideration for the maximum diameter of the permissible rolling circle as well as for the relative spacing and the buckle or warping of the inner faces of the tyres. With this method it is possible to remove only the minimum quantity of metal and thus increase considerably the useful life of the tyre or wheel.

Therefore, before starting the axle reconditioning operations it is necessary to know with a certain degree of accuracy the main dimensions of the axle, its defects and their order of magnitude and possible consequences as far as the other dimensional factors are involved.

Thus, for example, the following elements should be checked before commencing this reconditioning work:
(1) Position of wheels in relation to axle axis.
(2) Relative spacing of inner faces of tyres.
(3) Degree of warp, measured on inner faces.
(4) Diameters measured at rolling circles, and eccentricity (ies).
(5) Height of flanges.
(6) Thickness of flanges.
(7) Spindle diameter, ovalisation and eccentricity.
(8) Spindle taper.

This geometric examination of the axle is termed "survey" and the apparatus used therefor are termed surveying machines.

Two survey methods are now used:
(A) The so-called "in the air" method consisting in reading with measuring or comparison instruments the different elements cited hereinabove, each element being measured or checked with a different apparatus specially designed for this purpose.

With this method it is not possible to determine the total amplitude of deformation—as the axle is examined only at certain points, not on the whole—or the possible consequences of deformation on dimensional elements the knowledge of which is necessary for the machining step and which must be obtained after this step.

(B) The method consisting in utilizing a surveying machine on which the axle to be checked is mounted between center points, the deformations being measured by means of separate, non-recording indicators.

These machines are scarcely accurate and indicate the order of magnitude of deformation but not the actual dimensions (diameters, flange thickness, etc.). To obtain these useful and necesary data, separate instruments of the type used in the "in the air" method must be used, so that the working time and therefore the rolling-stock holdup are increased considerably.

The basic principle of the present invention is derived from the difficulties encountered in handling this problem as well as from the inadequacies of the prior art methods briefly summarized hereinabove. It is the object of this invention to provide a surveying machine for the purpose specified which is capable of indicating and recording simultaneously the dimensions and defects of an axle with a view to determine with the maximum precision on the one hand the different machining steps necessary for reconditioning the axle and on the other hand the maximum dimensions to be obtained during these machining steps, the surveying operation proper being performed during a relatively short time period. The defects of the axle thus checked are recorded on a paper sheet in order to show their influence on the axle dimensions and to determine the dimensions to be obtained by machining.

The surveying operation is accomplished during a single axle revolution.

The apparatus according to this invention comprises essentially on the one hand feelers disposed at the locations to be scanned, and on the other hand recording receivers assembled on a recording and control board.

The feelers and the recording receivers are electrically interconnected through a control box in which the remote-control members, adjustment device and protection elements are mounted; an assembly comprising one feeler and one receiver associated therewith constitute a recording unit.

The feelers transmit electrically from a remote location to the recording receivers the received signals (corresponding to geometrical deformation) according to the Wheatstone bridge principle. For each recording unit the bridge consists of two potentiometers having a suitable resistance which are mounted the one on the feeler and the other on the receiver.

The equilibrium of the bridge is disturbed when the feeler's finger is displaced, whereby the resistance of one side is altered. This equilibrium is restored by the resistance of the opposite side to vary automatically, for example by effecting the power-driven displacement of the slider of the potentiometer mounted on the recording receiver.

This variation is converted into length units reproducing with the desired amplification the displacement of the feeler finger and therefore the geometrical deformation to be measured.

In order to afford a clearer understanding of this invention and of the manner in which the same may be embodied in practice, reference will now be made to the accompanying drawings illustrating diagrammatically by way of example a typical embodiment of the invention. In the drawings:

FIGURE 6 is a wiring diagram showing the system for transmitting the data read by a feeler to the relevant recording apparatus;

FIGURE 7 is a diagrammatic view showing a feeler assembly with the cover removed;

FIGURES 8 and 9 are similar views showing two forms of embodiment of a receiver-recording unit.

Figure 1:
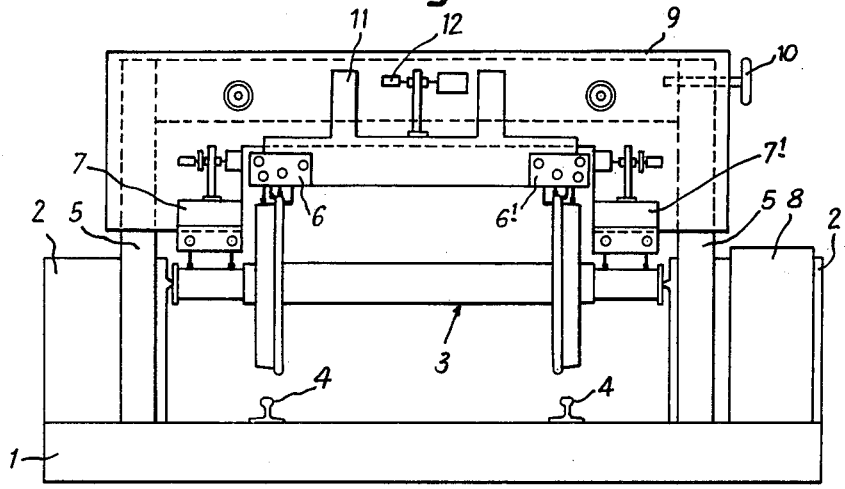
FIGURE 1 is a general diagrammatic view showing the surveying apparatus of this invention.

As shown in FIG. 1 of the drawings, the surveying apparatus according to this invention comprises a rigid base 1 on which are mounted two adjustable stocks 2 for mounting the axle 3 to be checked between center points. A fluid-actuated cylinder or like device (not shown) is provided for raising the axle to the proper height between the center points and lowering same on the rails 4 after completion of the surveying operation.

A structure 5 (in the form of a closed frame in order to avoid torsional or flexure deformation) supports a main carriage 9 adapted to slide horizontally along an upper cross member of the frame 5, the carriage movements being controlled through a screw and nut device by means of a handwheel 10.

This carriage 9 carries two blocks 7, $7^1$ each comprising the set of feelers for checking the corresponding axle spindle, these blocks being adjustable in the vertical direction through power means not shown, but conventional, and horizontally through hand-actuated drive means not shown, but conventional. Moreover, this carriage 9 supports another sub-carriage 11 adapted to slide vertically under the control of power means in relation to the main carriage 9, and carries in turn two blocks 6, $6^1$ each comprising the set of feelers for checking the two axle tyres.

A recording and control board 8 incorporates the receiver apparatus electrically connected to the feelers associated with recording styluses adapted to trace on a sheet of paper the curves or lines from which the defects and their relative positions may be determined.

The functional dimensions are read on revolution counters electrically connected to the different carriage; these revolution counters indicate for example the dimensions in tenths of millimeter.

Figure 2:
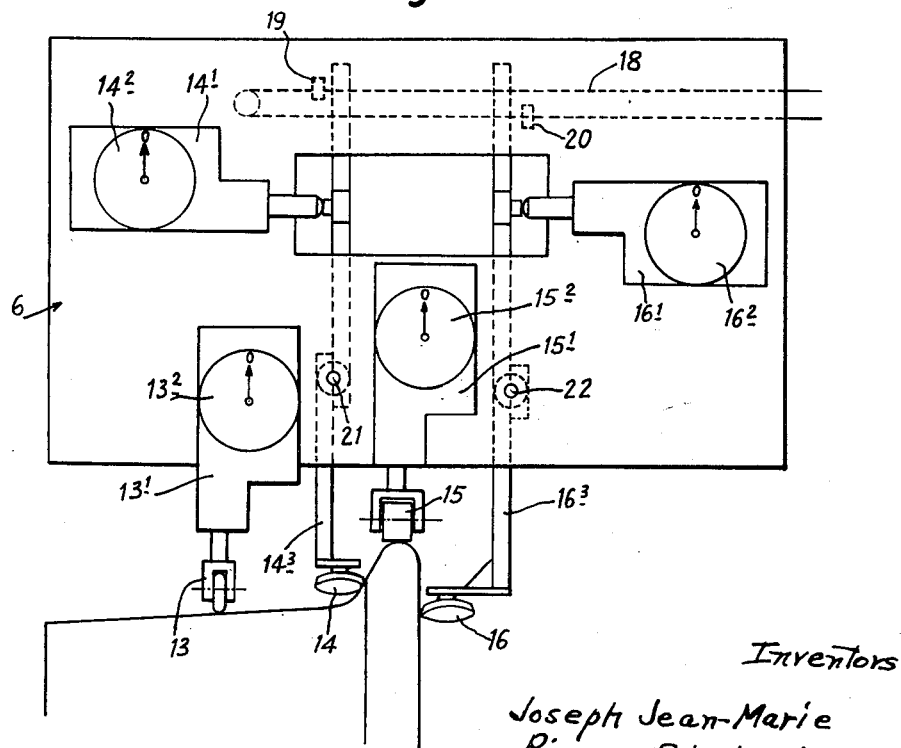
FIGURES 2 and 3 are a front view and a side view respectively of the type feeler units.
Figure 3:
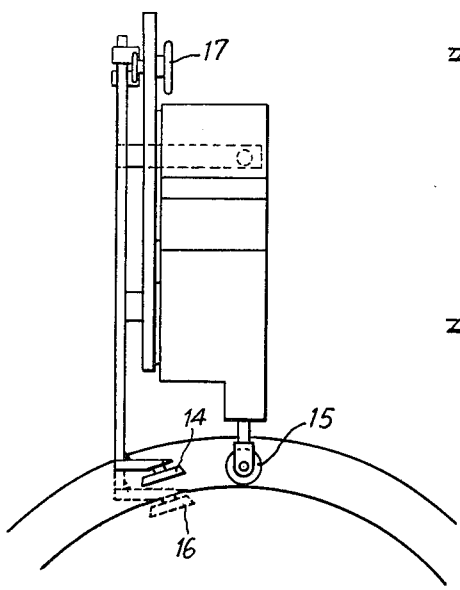

A block 6 incorporating the feelers for checking one tyre comprises for example (see FIGS. 2 and 3) a feeler 13 for checking the diameter of the rolling circle, a feeler 14 for checking the flange thickness, a feeler 15 for checking the flange height, and another feeler 16 for checking the inner face of the wheel. The mechanisms of these feelers are housed in cases $13^1$, $14^1$, $15^1$ and $16^1$ respectively, on which the dials $13^2$, $14^2$, $15^2$ and $16^2$ respectively of the deformation measuring instruments are mounted. Feelers 14 and 16 are actuated by means of levers $14^3$ and $16^3$ fulcrumed at 21 and 22, respectively. To place an axle on the test bench, the feelers 14, 16 are moved away from each other by rotating their relevant levers $14^3$, $16^3$ by means of a cable 18 controlled by a handwheel 17. The amplitude of this movement is limited by adequate stop members 19, 20.

Moreover, a revolution counter 12 (FIG. 1) gaged beforehand and electrically responsive to the vertical displacement of carriage 11 indicates the diameter of the rolling circle of one of the wheel tyres when the feeler concerned is at its zero position, the diameter of the other tyre being obtained by reading the deflection of the corresponding feeler index.

Figure 4:
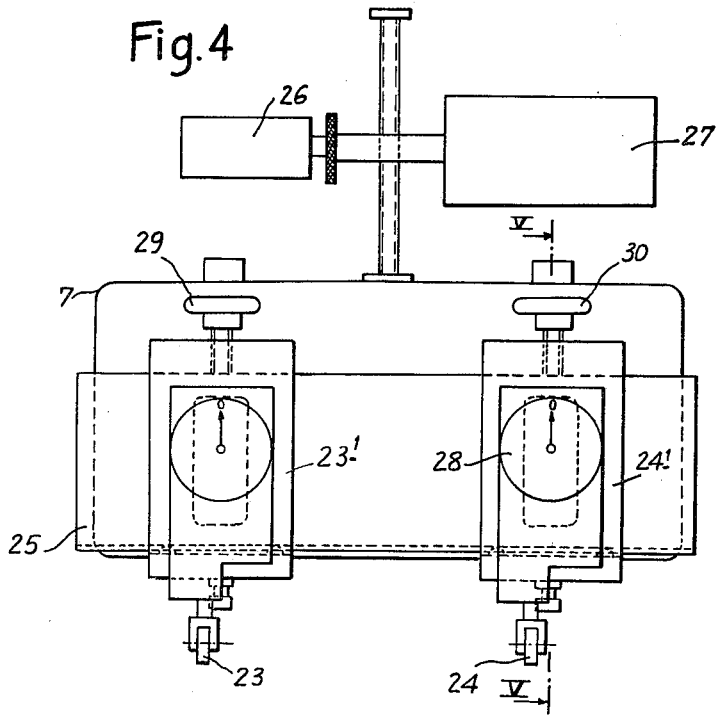
FIGURE 4 is a diagrammatic view showing the spindle feeler assembly.
Figure 5:
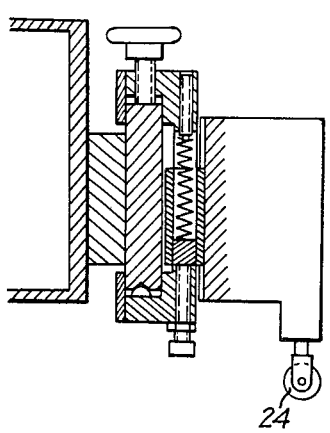
FIGURE 5 is a vertical sectional view showing details of the construction of the spindle feeler assembly, the section being taken upon the line V—V of FIG. 4.

A block 7 comprising the spindle control feelers (FIGS. 4 and 5) incorporate two feelers 23, 24 having their cases $23^1$, $24^1$ adapted to slide horizontally on a cross member 25 and to be locked in the desired position by means of clamping wheels 29, 30. A revolution counter 26 associated with the motor 27 controlling the vertical movements of block 7 indicates the diameter of each spindle for example by means of a feeler 23 when the latter is at its zero position. In this case the other feeler 24 will indicate on its dial 28, through the difference obtained with the preceding feeler, the taper of this spindle.

All the feelers associated with the typres and spindles are provided with safety means, for example gaged springs, to avoid any risk of damage in case of overstepping of the the maximum permissible stroke. They are isostatically mounted on the supports, carriages or slideways.

The feelers disposed as set forth hereinabove are associated with devices for transmitting signals corresponding to the deformation of the part thus checked and these signals are received by recording receivers mounted on the control board 8 (FIG. 1).

This remote transmission of signals takes place through a Wheatstone bridge (FIG. 6) having two adjacent sides $R_1$, $R_2$ housed in the case of feeler P together with the slider 37 operatively connected to the feeler, the other two sides $R'_1$, $R'_2$ as well as their comparison slider 38 being housed in the case of the recording receiver P'. The electrical wiring connections between the sides $R^1$, $R^2$ on the one hand and sides $R'^1$, $R'^2$ on the other hand are those illustrated in the wiring diagram of FIG. 6 through wires 40 and 41 connected respectively to the + and − terminals of a suitable source of current. Both sliders 37 and 38 are connected through wires 42 and 43 to the winding of a relay 39 for example of the biased telegraphic type having its contact arm 44 adapted to take three positions, namely, upper contact at 31, lower contact at 32, and intermediate inoperative position.

A micromotor 45 for actuating the slider 38 is energized for example as follows: it has one terminal connected to the contact arm 44 and the other terminal connected to a zero potential taken between the plus terminal connected in turn to the relay terminal 31 and the minus terminal connected to relay terminal 32.

The bridge is so adjusted that a position of equilibrium if obtained when for any position of slider 37 (operatively connected to the feeler) the slider 38 connected to a stylus of the recording receiver is in a predetermined position. If this position is not attained at a given moment by the slider 38 due to a displacement of slider 37, the bridge equilibrium is upset and as a consequence a current flowing in a direction corresponding to the direction of the unbalance energizes the relay winding 39. Thus, contact arm 44 closes one of the two contacts 31 or 32 and the motor 45 is started in one of the other direction (according as it is energized through contact 31 or contact 32); under these circumstances, slider 38 is driven in the requisite direction for restoring the bridge equilibrium.

According to a specific embodiment of the present invention, as shown in FIG. 7, a feeler P comprises a support 56 carrying a rack 35 having one end solid with a scanning finger T, and a return spring 58 constantly urging this finger for engagement with the element or part to be checked. Through a train of gears 33, 34 providing a ratio consistent with the amplitude of the finger movement and the desired degree of precision of the measurements to be made, this rack transmits the received signals to the shaft of slider 37 of potentiometer comprised of $R^1$ and $R^2$. The maximum stroke of finger T corresponds to a complete scanning of the winding of potentiometer $R^1$, $R^2$ by the relevant slider 37.

A compensator spring (not shown) is mounted on the potentiometer shaft for taking up any play in the gear operation. Adjustable stops 46, 47 limit with the assistance of finger 36 the permissible stroke of rack 35 in either direction to permit the proper gaging of the apparatus at the desired zero position.

An index solid with the potentiometer shaft permits a direct reading of the value of the finger displacements.

According to a first embodiment of the recording receiver (FIG. 8) the later comprises a case 57 of relatively small dimensions (thus, its horizontal projection in the plane of writing may be for example about 3″ x 2″ for a maximum stroke of the recording stylus of about 2″). Mounted in this case is the potentiometer $R'^1$, $R'^2$ having its shaft operatively connected to the micromotor 45 through gears 48, 51 and a worm 49, as shown.

Another train of gears 50 having a pinion keyed on the worm shaft drives with a suitable ratio a shaft 52 threaded throughout its length. A non-revolving nut 53 is longitudinally displaceable during the rotation of this threaded shaft and carries the recording stylus 55.

An electro-mechanical brake 54 is mounted on the worm shaft to stop the motor when the motor energizing circuit is open. This brake is responsive to an electromagnet having its coil 63 inserted in the motor circuit, as shown.

As an alternate embodiment (FIG. 9) the worm controlling the writing stylus may be replaced by a cable 61 passing over a set of loose pulleys 60 and over a driving pulley 59 of a diameter corresponding to the desired amplication, this driving pulley being rigid with the potentiometer shaft; in this case the stylus 55 is secured on the driving wire.

Figure 10:
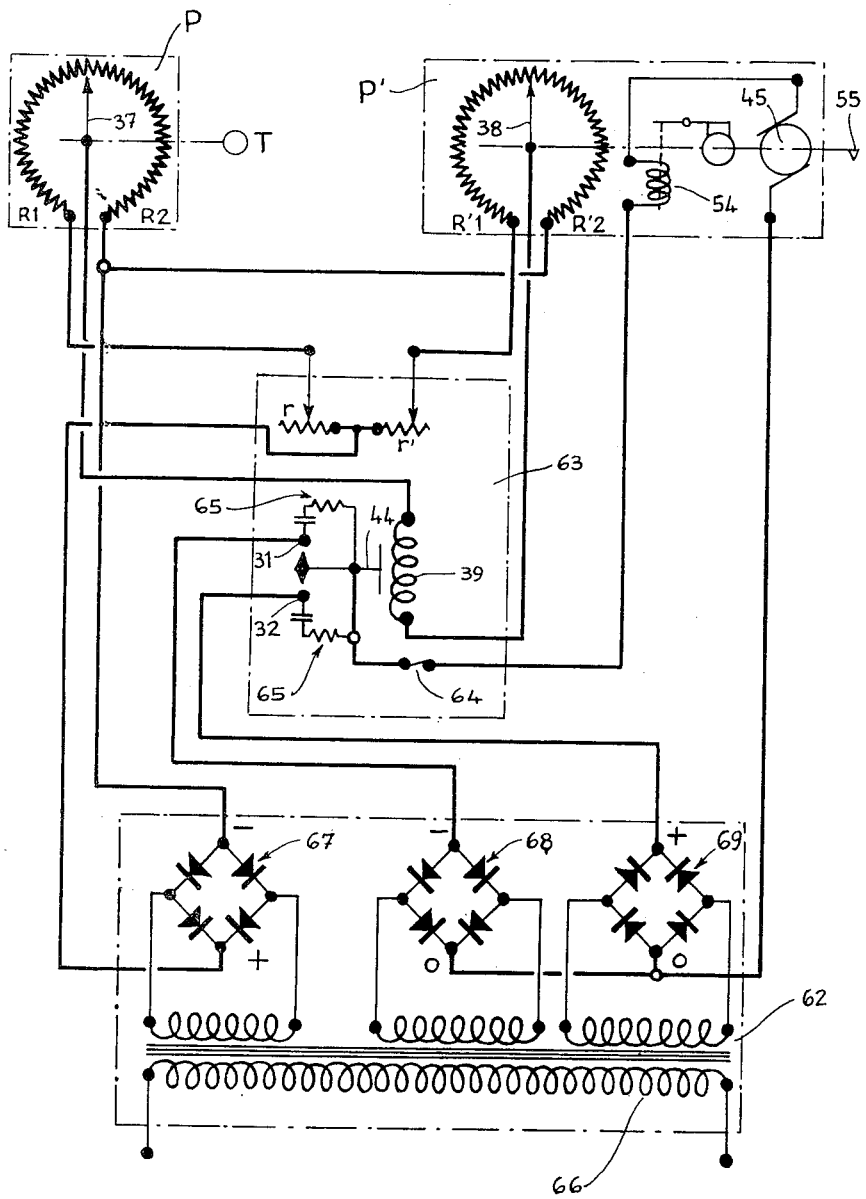
FIGURE 10 is a developed wiring diagram completing that of FIG. 6.

In the general wiring diagram of a feeler-recording assembly which is illustrated in FIG. 10 (and incorporates and completes the diagram of FIG. 6) there is shown in addition to feeler P and recorder P' a box 63 containing different elements and assembling different connections and electrical safety and adjustment members, and another box 62 containing the feed devices.

In the first box 63 two adjustable resistors $r$ and $r'$ are mounted at the inlets corresponding to the two potentiometers; the purpose of these resistors is to complete the adjustment of the position of the recording stylus; they are mounted inside the box 63 and by altering their adjustment it is possible to slightly modify the degree of equilibrium of the Wheatstone bridge in order to bring the receiver zero to the desired location. A fuse 64 mounted in the box 63 and inserted in the motor circuit protects the motor in case of untimely blocking. Spark arresters 65 protect the biased relay contacts 31, 32 mounted similarly in the same box 63.

The supply box 62 contains a transformer 66 having its primary winding connected to the alternating-current mains and three secondaries delivering their outputs to the rectifying bridges 67, 68 and 69, respectively. The first bridge supplies current through its + and − terminals to the Wheatstone bridge as in the case illustrated in FIG. 6.

Both bridges 68 and 69 are interconnected in series with the zero central point connected in turn to one of the terminals of motor 45, the plus terminal of bridge 69 being connected (for example) to the terminal 32 of relay 39, and the minus terminal of the same bridge 69 to the terminal 31 of the same relay.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. Machine for evaluating a railway axle having spaced wheels, comprising a fixed support, a first carriage, a pair of spaced feeler-holder blocks, one for each wheel of the axle, rigidly connected with the said carriage, a plurality of tire feelers mounted stationarily on each of the feeler-holder blocks in positions especially adapted to the profile of the wheels of the type of axle to be evaluated, said feelers being displaced in response to surface variations, means associated with each of the feelers to place its contact in contact with the surface of a wheel, means for transmitting and recording on a single sheet a linear displacement of all the contacts of the feelers during revolution of the axle, a second carriage mounted on said fixed support, means for moving said second carriage parallel to the direction of the railway axle, said first carriage being mounted on said second carriage, means for adjusting said first carriage in a direction at right angles to the movement of said second carriage, and means for receiving a railway axle and effecting the rotation thereof.

2. Evaluation machine according to claim 1 in which the assembly of the feelers for each wheel comprises a feeler of the inner face, a feeler of the height of the flange, a feeler of the outer face, and a feeler of the tread circle.

3. Evaluation machine according to claim 2 in which the contacts o the feelers of the inner and outer faces are mounted on levers which transmit by pivoting the movements of said contacts to the movable detection elements of their respective feelers, means being furthermore provided to swing said levers in such a manner as to move their contacts away during a change of axles.

4. Evaluation machine according to claim 1 in which there are furthermore provided two feeler-holder blocks for the verification of the journals, on each of said blocks at least two feelers which are stationary during the survey, means for adjusting the position of each contact of said feelers and means associated with each of said feelers to place its contact in contact with the surface of a journal.

References Cited by the Examiner

UNITED STATES PATENTS

| | | | |
|---|---|---|---|
| 1,688,330 | 10/1928 | Gunther | 33—172 |
| 2,030,237 | 2/1936 | Brittain | 33—174 |
| 2,030,244 | 2/1936 | Cox | 33—172 |
| 2,396,420 | 3/1946 | Hayward | 346—32 |
| 2,509,185 | 5/1950 | Eckel | 33—179.5 |
| 2,537,498 | 1/1951 | Wickesser | 346—32 |
| 2,687,576 | 8/1954 | Mahr | 33—179.53 |
| 2,858,615 | 11/1958 | Aller | 33—174 |
| 3,023,506 | 3/1962 | Tandler | 33—174 |
| 3,125,811 | 3/1964 | Pierce | 33—174 |

FOREIGN PATENTS

| | | |
|---|---|---|
| 887,651 | 11/1943 | France. |
| 685 | 1889 | Great Britain. |
| 673,760 | 6/1952 | Great Britain. |

LOUIS R. PRINCE, *Primary Examiner.*

LEONARD FORMAN, ROBERT L. EVANS, *Examiners.*